Aug. 17, 1965  C. J. GRANT  3,200,494
CUTTER
Filed Dec. 19, 1963  2 Sheets-Sheet 1
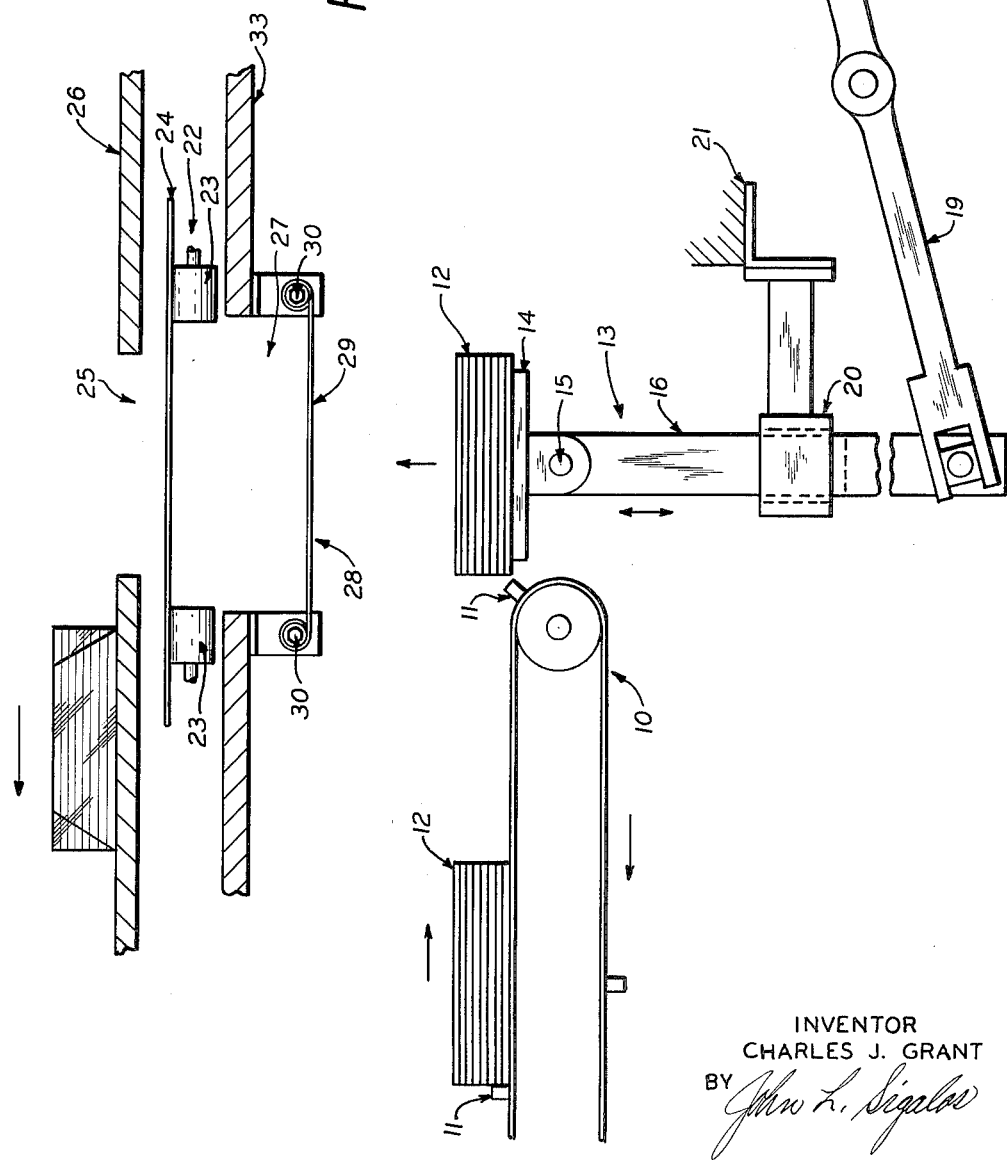
INVENTOR
CHARLES J. GRANT
BY
ATTORNEY.

Aug. 17, 1965     C. J. GRANT     3,200,494
CUTTER
Filed Dec. 19, 1963     2 Sheets-Sheet 2
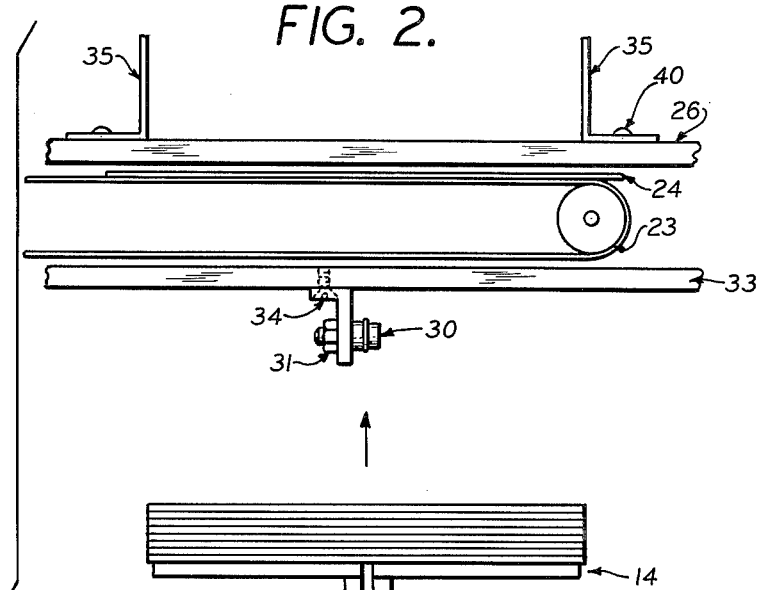
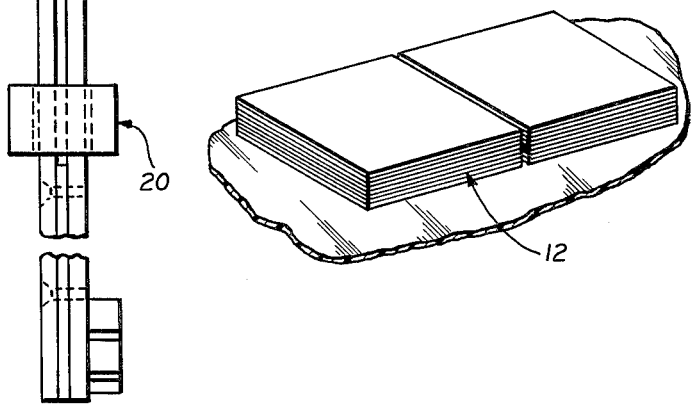
INVENTOR
CHARLES J. GRANT
BY *John L. Sigalos*
ATTORNEY.

United States Patent Office 3,200,494
Patented Aug. 17, 1965

3,200,494
CUTTER
Charles James Grant, Plymouth, Wis., assignor to The Borden Company, New York, N.Y., a corporation of New Jersey
Filed Dec. 19, 1963, Ser. No. 331,872
2 Claims. (Cl. 31—26)

This invention relates to a device for packaging comestibles and in particular to an improved device provided with cutting means for cutting cheese stacks just prior to packaging.

Sliced cheese, such as sliced American cheese, and other foods are conventionally packaged in plastic films by the use of such equipment as the Hayssen standard overwrap machine. In such apparatus the sliced cheese stack is placed on a conveyor which indexes the cheese onto an elevator which reciprocates vertically. The elevator raises the cheese into a sheet of wrapping film causing the film to adhere to the top surface and two sides of the stack. The cheese stack then continues through a standard wrapping procedure where the wrapping film is completely folded about the cheese stack and sealed. Sliced cheese and other foods are also packaged in other machines having a similar reciprocating motion.

While the above known and standard procedures have worked satisfactorily for individual stacks of cheese, they were found to be unsatisfactory for the packaging of two or more separate stacks of cheese in the same package. In this procedure, two or more stacks are placed on the elevator and wrapped. However, there is an excessive amount of mold growth on the cheese surfaces between the stacks due to this handling of the cheese. In addition, it is difficult to properly align the cheese stacks side by side. Attempts to place one stack of cheese upon another and then wrap were unsatisfactory, again because of the difficulty in accurately aligning the stacks.

The instant invention overcomes the deficiencies and prior apparatus by providing cutting means which will cut the cheese stack and other comestibles into uniform pieces of desired shape and size moments before the cheese is packaged, resulting in an accurate clean cut without contamination of the inner cut surfaces.

Briefly stated, the present invention comprises the herein described apparatus and parts thereof, particularly the improvement in apparatus in which a comestible is moved by an elevator to a wrapping station wherein cutting means are positioned between the path of the elevator and the wrapping station, and the elevator is provided with slot means in planar alignment with said cutting means.

Other objects and features of the invention will be apparent from the following description and drawings, which are for the purpose of illustration only, in which:

FIGURE 1 is a side elevational view of an embodiment of the invention.

FIGURE 2 is an elevational section of the embodiment of the invention shown in FIGURE 1.

FIGURE 3 is a perspective view of a stack of cheese sliced in two.

The parts of the apparatus not illustrated are conventional.

Referring to the drawings there is shown a driven continuous conveyor 10 having indexing lugs 11 for conveying and indexing stacks of sliced cheese 12 onto elevator means 13. The movement of the continuous belt is synchronized with that of the elevator means 13 to provide for indexing of the cheese stacks 12 onto the elevator means 13.

The elevator means 13 consists of a platform 14 fastened by means of a bolt 15 to an elevator bar 16 mounted in guide 20. The guide 20 is fastened to post means 21 (shown only partly). The platform 14 and bar 16 are provided with a slot 17. The elevator means are reciprocated vertically by drive means 18 attached by means of driving rod 19 to the bottom of the bar 16. The driving means for the conveyor 10 and drive means 18 are conventional and not shown.

Positioned above the elevator means 13 is a film carrier 22 which includes a pair continuous conveyors 23. The carrier 22 positions a sheet of wrapping film 24 under opening 25 in wrapping table 26 and directly over the elevator means 13.

Plate 33 is positioned below the carrier 22 and is provided with an opening 27 which is in vertical alignment with the opening 25 in table 26. Depending below plate 33 and across opening 27 is cutting means 28. The cutting means 28 consists of a wire 29 fastened to bolts 30. The bolts 30 are attached by means of nuts 31 to brackets 32 held to the bottom of plate 33 by screws 34.

The wire 29 is in planar alignment with slot 17 in platform 14 and rod 16. The slot 17 is of a width sufficient to allow passage of wire 29 and extends into bar 16 to a depth sufficient to accommodate wire 29 when elevator means 13 has made its maximum upward travel.

Fastened, as by bolts 40, to the upper surface of the wrapping table 26 at opening 25 are side folders 35 which function to fold the wrapping film about the two sides of the stack of cheese are explained in greater detail below. The side folders 35 are spaced apart for a distance dependent upon the width of the cheese stacks, as described later herein. Change parts are provided for each size cheese product.

The cheese stack 12 in film 24 then continues through the remainder of the packaging procedure after being discharged from the elevator platform 14 at its uppermost position.

The details of the remainder of the packaging apparatus have not been shown since they are conventional and have no bearing on the instant invention.

The operation of the apparatus is largely evident from the description given. A stack of cheese slices 12 is placed on conveyor 10 which indexes the stack onto the elevator platform 14 when it is in its lower most position. The index lug 11 deposits the cheese stack 12 on the platform 14.

As the platform 14 begins to rise the film carrier 22 synchronized with the elevator means 13 positions a sheet of wrapping film 24 under opening 25. As the elevator means 13 progresses upward, the wire 29 remains stationary and the cheese stack 12 is driven through it cutting the cheese. As the elevator means 13 continues upward through opening 27, the wire 29 passes into the slot 17 in the platform 14 and bar 16.

The cut cheese stack 12 continues upward and into the wrapping film 24 which it carries with it through opening 25 and past side folders 35. The side folders 35 are spaced apart to a width slightly larger than that of the stacks of cheese. This causes the wrapping film 24 to adhere to the top and two sides of the cheese stack 12. The cheese stack 12 is then discharged from the elevator platform 14, and continues through the remainder of the standard wrapping cycle. The elevator means 13 from this uppermost position returns to its lowermost position to receive a new cheese stack 12 and repeat the cycle.

While the invention has been described with reference to the standard Hayssen overwrap machine, it is obvious that it can be used with any machine that has a similar reciprocating motion. Moreover, there is no limitation as to the number of cutting wires and the product may be cut, for example, into halves, thirds or quarters, or even into fanciful designs. Thus, if it is desired to have two stacks of sliced cheese in a package with the slices measuring 3⅜" by 3⅜" by 11⅛" high (a standard size), the measurements of the slices of cheese in stack of cheese placed on the elevator means should be 6¾ inches long by 3⅜ inches wide, by 1¹¹⁄₁₆ inches high.

As to the materials of construction, the machine is made of those commonly used for such purposes. The elevator means, wrapping table, and side folders are of steel and preferably stainless steel, and the conveyors are of stainless steel or neoprene coated canvas. The cutting wire is preferably .040 inch music wire. A knife may be satisfactorily used in place of the wire, but the comestible to be cut, such as cheese, tends to build up on the surface thereof.

It is to be understood that it is intended to cover all changes and modifications of the examples of the invention herein chosen for the purpose of illustration which do not constitute departures from the spirit and scope of the invention.

What is claimed is:

1. A machine for packaging comestibles wherein a comestible is moved by an elevator to a wrapping station, comprising a wrapping station, elevator means positioned below said station comprising a platform mounted on a rod and adapted to raise comestibles to said station, at least one cutting element positioned between the path of said elevator means and said station, and means defining a slot extending through said platform and into said rod to a depth sufficient to accommodate said cutting element when said elevator means has made its maximum upward travel, said slot being in planar alignment with and adapted to receive said cutting element.

2. A machine for packaging cheese wherein cheese is moved by an elevator to a wrapping station, comprising a wrapping station, elevator means positioned below said station comprising a platform mounted on a rod and adapted to raise the cheese to said wrapping station, a wire cutter positioned between the path of said elevator means and said station, means for positioning a sheet of wrapping film below said wrapping station and above said wire cutter, and means defining a slot extending through said platform and into said rod to a depth sufficient to accommodate said wire cutter when said elevator means has made its maximum upward travel, said slot being in planar alignment with said wire cutter to permit passage of the wire through said platform and into said rod.

References Cited by the Examiner

UNITED STATES PATENTS

| 828,397 | 8/06 | Friday | 31—26 |
| 2,108,546 | 2/38 | Ness. | |

SAMUEL KOREN, *Primary Examiner.*

HUGH R. CHAMBLEE, *Examiner.*